United States Patent Office.

CARL V. PETRAEUS, OF JOPLIN, MISSOURI.

RUBBER COMPOUND.

SPECIFICATION forming part of Letters Patent No. 584,959, dated June 22, 1897.

Application filed July 2, 1894. Serial No. 516,361. (Specimens.)

*To all whom it may concern:*

Be it known that I, CARL V. PETRAEUS, a citizen of the United States, residing at Joplin, in the county of Jasper, in the State of Missouri, have invented an Improved Rubber Compound, of which the following is a true and exact description.

My invention relates to the manufacture of vulcanized rubber, and has for its object to provide a compound by which the weight, blackness, and luster of the rubber will be increased without injury to the substance of the gum.

Various manufactured compounds of lead have heretofore been used as ingredients in the rubber compound prepared for vulcanization. These compounds are, however, more or less acted upon and altered injuriously in vulcanizing, and my invention is based on the discovery which I have made that native lead sulfid or galena ore finely powdered and thoroughly mixed with caoutchouc and other ingredients of the rubber compound will be entirely unacted upon by the sulfureted hydrogen formed during the process of vulcanization and will impart to the vulcanized rubber both the desired weight and a rich and lustrous black color, and in addition will enable me to save sulfur and will produce an article of superior quality. Preferably I use in addition to the powdered galena a certain percentage of lead oxid, the oxid being used to combine with excess of sulfur and prevent what is called "blossoming out" on the surface of the finished goods.

In making up my new rubber compound I have found the best results to be attained by mixing with one hundred parts of caoutchouc from ten to twenty parts of sulfur (according to the degree of hardness desired in the compound) and an equal quantity of finely-powdered native lead sulfid or galena with, preferably, some lead oxid in admixture. The proportionate quantity of powdered galena may be considerably increased over that given and excellent results still attained, and it will be understood that other constituents commonly used in rubber compounds may be employed in my compound, the mixed-up ingredients being subjected to the usual vulcanizing action.

Having now described my invention, what I claim as new, and desire to secure by Letters Patent, is—

1. A rubber compound having in admixture with caoutchouc and sulfur, finely-powdered native lead sulfid or galena.

2. A rubber compound having, in admixture with caoutchouc and sulfur, finely-powdered native lead sulfid or galena and lead oxid.

CARL V. PETRAEUS.

Witnesses:
W. B. JEFFREY,
GALEN SPENCER.